United States Patent [19]
Glassgold et al.

[11] Patent Number: 5,781,807
[45] Date of Patent: Jul. 14, 1998

[54] CLOSE-UP ATTACHMENT FOR A DIGITAL CAMERA

[75] Inventors: William Glassgold, Plam Beach Garden; Donald Musso, Jupiter, both of Fla.

[73] Assignee: Lester A. Dine, Inc., Palm Beach Gardens, Fla.

[21] Appl. No.: 698,888

[22] Filed: Aug. 16, 1996

[51] Int. Cl.$^6$ .......................... G03B 15/03; G03B 17/48
[52] U.S. Cl. .................. 396/71; 396/176; 396/544; 348/371
[58] Field of Search ................ 396/71, 176, 182, 396/199, 373, 529, 544; 348/335, 369, 370, 371; 355/63; 358/909.1

[56] References Cited

U.S. PATENT DOCUMENTS

| | | | |
|---|---|---|---|
| D. 283,820 | 5/1986 | Lemmey | D16/6 |
| D. 283,821 | 5/1986 | Lemmey | D16/44 |
| 2,942,537 | 6/1960 | Zimmerman | 396/544 |
| 3,385,188 | 5/1968 | Ellman | 396/544 |
| 3,687,030 | 8/1972 | Dine et al. | 396/544 |
| 3,836,927 | 9/1974 | Dine et al. | 396/544 |
| 4,168,897 | 9/1979 | Gates | 396/71 |
| 4,310,231 | 1/1982 | Konishi et al. | 396/71 |
| 4,755,838 | 7/1988 | Lemmey | 396/71 |
| 5,293,242 | 3/1994 | Mamiya | 348/370 |
| 5,294,948 | 3/1994 | Merkt et al. | 396/544 |
| 5,541,686 | 7/1996 | Stephenson | 396/544 |

*Primary Examiner*—A. A. Mathews
*Attorney, Agent, or Firm*—Darby & Darby

[57] ABSTRACT

A kit for modifying a digital camera of the type including a built in flash, to perform close-up photography includes a mounting plate attached to a camera around a camera lens, a lens plate having a secondary lens selectively attachable to the mounting plate so that light entering the camera lens is first magnified by the secondary lens. A bracket assembly is selectively attachable to each lens plate to indicate the location of the focal plane and the size of the image frame. A flash attachment adapted for close-up photography includes a flash output window, a power switch, a mode switch and a flash intensity switch. The flash attachment is secured to the camera and wired thereto so that the mode switch may control which flash unit, the flash of the camera or the close-up flash, activates. The flash intensity switch is a rheostat and controls the amount of light emanating from the flash source to the subject, according to the distance between the camera and the subject.

1 Claim, 7 Drawing Sheets

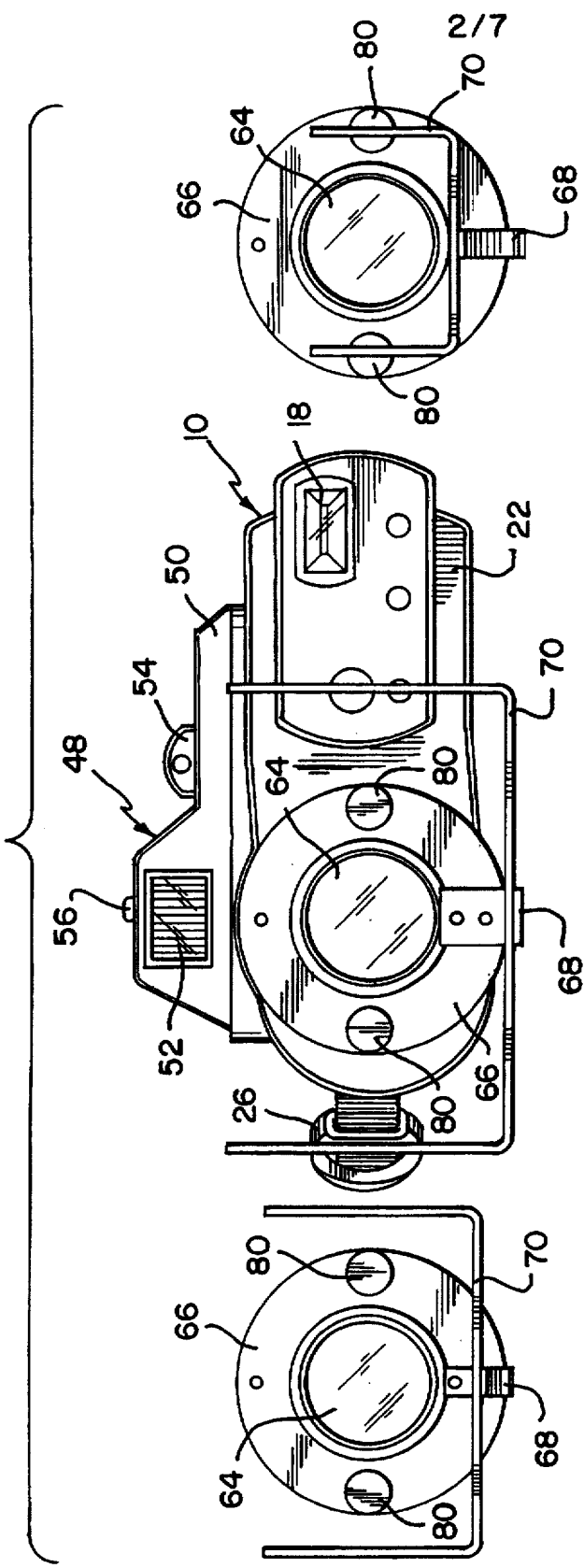

CLOSE-UP ATTACHMENT FOR A DIGITAL CAMERA

This application is based on Applicants' provisional patent application, Ser. No. 60/002,386, filed Aug. 17, 1995.

BACKGROUND OF THE INVENTION

This invention relates generally to attachments for cameras and more particularly to such attachments for facilitating close range photography with digital cameras.

Digital cameras that are currently available produce an electronic digitized signal representative of image data when taking a "photograph" of a subject. This signal is initially electronically stored in the camera and can be later reproduced in a computer or video recorder as a visual display of the subject. However, such cameras are generally lacking in the ability to accomplish close range photography, such as where the subject to be photographed is between two and eighteen inches from the camera, as is often needed in various medical, dental, journalistic and law enforcement applications, or scientific or amateur photography of plants, insects, flowers, or the like. Photography in this range of focus is generally referred to as close-up photography.

Close-up photography presents problems which are not common to standard photography. For example, positioning of the subject and selection of the proper lens focal distance are necessarily more exacting and require greater care in close-up photography than in ordinary photographic applications. Attempts to solve such problems in optical photography are the object of certain prior art patents such as U.S. Pat. No. 3,687,030 issued Aug. 29, 1972, No. 3,836,927 issued Sep. 17, 1974, No. 4,755,838 issued Jul. 5, 1988 and Des. 283,820 and 283,821 issued May 13, 1986, as well as the prior art references cited in those patents.

Another problem associated with close-up photography relates to the source of light used to achieve proper exposure, e.g., an electronic flash. For standard photography, where a focal length of a typical lens allows focussing of subjects that are at least four feet or more away from the camera, the location of a flash source is not critical. A commonly used built-in electronic flash source is frequently spaced away from the lens axis by a distance which is immaterial for the more distant subjects, but which would prevent proper illumination of close-up subjects (i.e., subjects that are from about two inches to about eighteen inches from the lens). Also, as the distance between the camera lens and the subject is varied, the intensity of the light from the built-in camera flash projected onto the subject correspondingly varies, so that light incident on a subject which is, for example, at a distance such as eighteen inches from the camera lens will be substantially less than if the same subject was positioned at a two inch distance from the camera and illuminated by the same amount of light from the flash source. Without control of the flash output, the increase in intensity of light from a flash at close range will invariably result in overexposed or otherwise improperly exposed pictures of the subject. In such instance, the subject will appear washed out in the reflected light of the flash and image detail of the subject will be lost.

According to the present invention, an improved camera attachment or kit for modification of an existing digital camera is provided for assuring proper illumination of a subject photographed at various close ranges, for use with digital camera equipment having a flash-type light source.

Another object of the invention is to provide a new and improved camera attachment or modification for digital cameras to control the illumination of the subject by flash light at various close-range distances from the camera lens.

Another object of the present invention is to provide a new and improved camera attachment and modification to facilitate proper focusing and framing of close-range subjects, while providing proper illumination by flash exposure.

Another object of the present invention is to provide a new and improved camera attachment for digital cameras that enable such cameras to perform close-up photography and which may be easily detached to allow the camera to perform standard non-close-up photography.

SUMMARY OF THE INVENTION

A kit for modifying a digital camera of the type including a built-in flash, to perform close-up photography, includes a mounting plate attached to a camera around a camera lens, and a lens plate having a secondary lens selectively attachable to the mounting plate so that light entering the camera lens is first magnified by the secondary lens. A bracket assembly is selectively attachable to each lens plate to indicate the location of the focal plane and the size of the image frame. A flash attachment adapted for close-up photography includes a flash output window, a power switch, a mode switch and a flash intensity switch. The flash attachment is secured to the camera and wired thereto so that the mode switch may control which of two available flash units, the flash of the camera or the close-up flash, activates. The flash intensity switch is a rheostat and controls the amount of light emanating from the flash source to the subject, according to the distance between the camera and the subject.

BRIEF DESCRIPTION OF THE DRAWINGS

A more complete appreciation of the invention and of the advantages thereof will be obtained by reference to the following detailed description considered in connection with the accompanying drawings.

FIG. 2 shows a front elevation view of a digital camera modified according to the invention, and lens/frame attachments used with the camera;

DESCRIPTION OF A PREFERRED EMBODIMENT

Figure 1A:
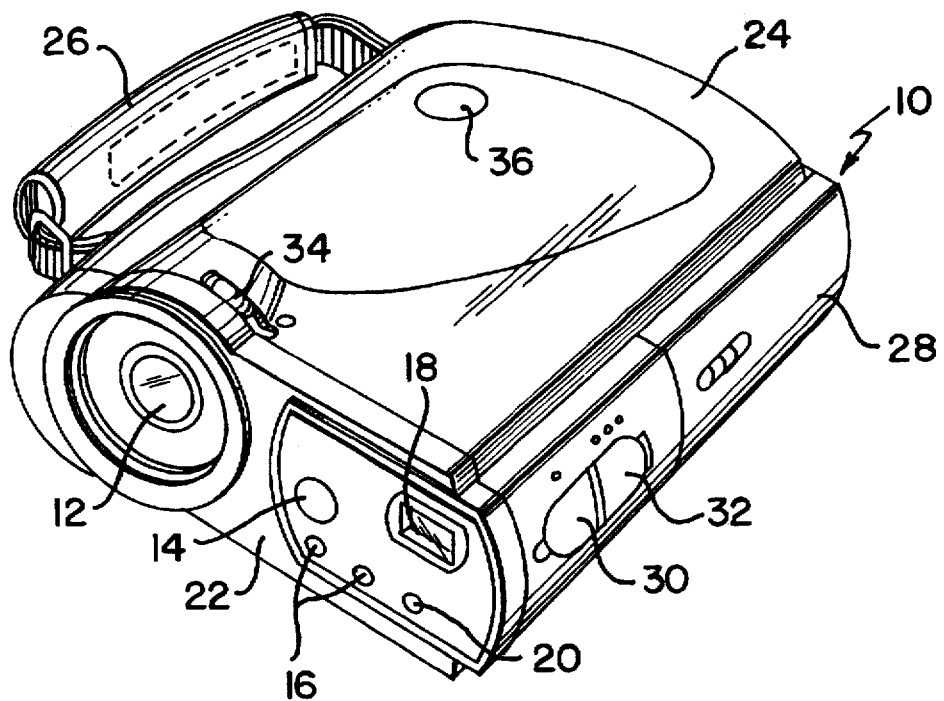
FIGS. 1A and 1B are schematic perspective front and rear diagrams of a conventional digital camera.
Figure 1B:
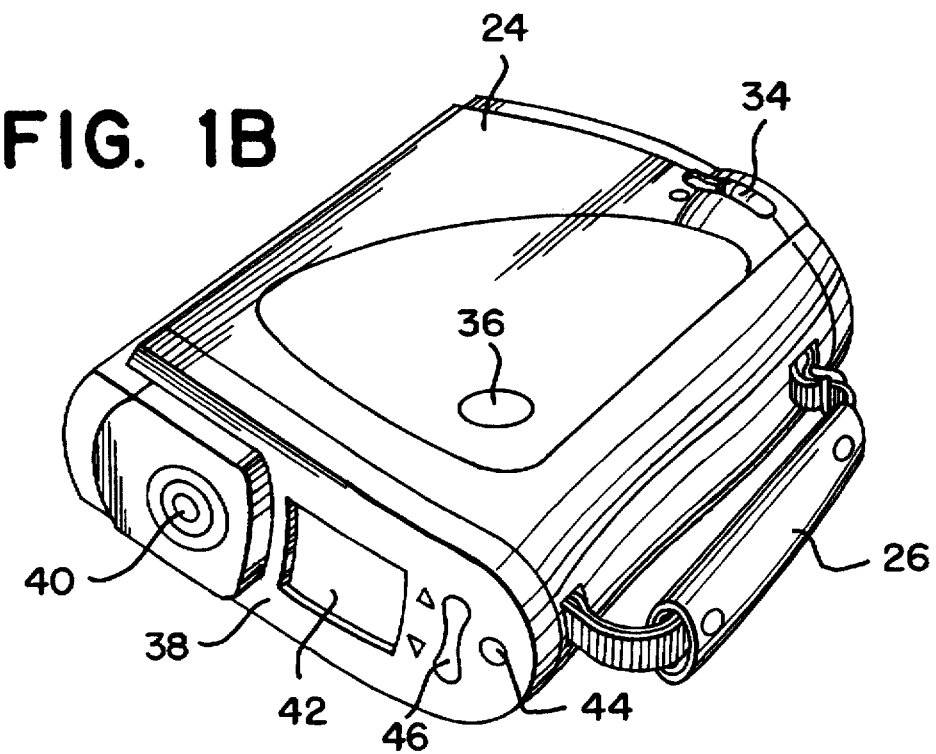
Figure 3A:
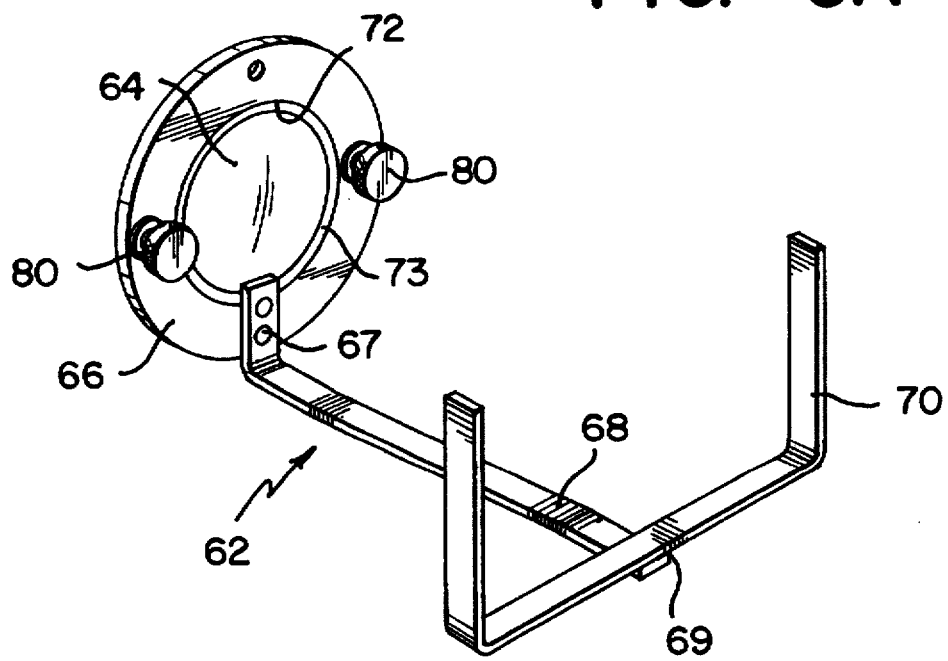
FIGS. 3A and 3B are perspective and side views of the supplemental lens and framing device used in the present invention.
Figure 3B:
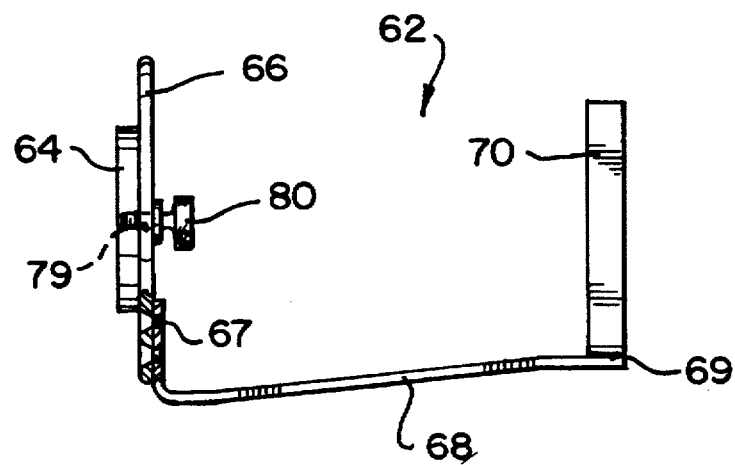

FIGS. 1A and 1B show diagrammatically front and rear perspective views of a representative digital camera 10, such as that commercially sold by Eastman Kodak Company under the designation Kodak Digital Camera 40. This camera 10 includes a lens 12, a view finder 14, light sensors 16, a flash window 18 and a timer light 20 on a front surface 22 of a camera housing 24, to which is attached a hand strap 26. A battery compartment 28 (shown covered) holds a battery (not shown) serving as a power supply for the camera. An adapter connection 30 (shown covered) is provided for receiving an adapter to supply the necessary electrical power to operate camera 10 and to charge a rechargeable battery in battery compartment 28. A serial port connector 32 (shown covered) is also provided on the side of camera housing 24 to which may be electrically connected a cable (not shown) leading and also electronically connected to electronic apparatus (such as a video recorder or monitor) for transmitting the digital image signal produced and stored within camera 10 to such apparatus. An "off/on" switch 34 is provided to control the power supplied to the electronic circuits (not shown) from battery 28. Switch 34 also mechanically or electro-mechanically positions a lens cover (not shown) over lens 1 2 when switch 34 is moved to an "off" position. A shutter button 36 is provided to actuate camera 10 to record a digitized signal of light entering lens 12 representing the reflected light from a subject being viewed through viewfinder 14.

Along a rear surface 38 of camera 10, as shown in FIG. 1B, is a view-finder eye piece 40 and a display 42 used to show the image being viewed. A feature button 44 and a select button 46 are used to determine and select any one of the various modes of operation of the camera.

As mentioned above, lens 12 may for example have a fixed focus of four feet or more. It is generally not suitable for close-up photography because such a lens is designed for a minimum distance of about four feet before the subject "enters" the depth of field or window of focus of the lens. Furthermore, flash 18 in such a camera 10 is designed to concentrate its projected light at a point located a relatively long distance from camera 10, (e.g., at least four feet) and is not able (without modification) to project its light to any subject located at a close range from camera 10.

The present invention supplies certain additional and replacement parts to adapt digital camera 10 for use with close-up subjects. These parts may be in the form of a kit for attachment of the camera or may be built into the camera.

Referring to FIGS. 2–7, according to the invention, camera 10 is provided with a separate flash attachment 48 having a casing 50, a flash output window 52, a power switch 54, a mode switch 56, and a control knob 58. Flash attachment 48 may either include its own power supply, such as an internal battery (not shown) or include appropriate power supply wiring which is connected to the proper power circuitry of camera 10, as is understood by those in the art. In the former instance, the flash attachment 48 may simply be secured to housing 24 of camera 10 in an appropriate location and using an appropriate fastener, such as Velcro, a screw fastener, or an appropriate pressure sensitive tape or adhesive. In the latter instance, flash attachment 48 is electrically connected to the circuitry of camera 10 so that power switch 54 may replace on/off switch 34 (FIG. 1A) and control the power supplied to camera 10. Regardless how the power to flash attachment 48 is supplied, such power is controlled by power switch 54 in a manner well known in the art.

The specific intensity of the flash, i.e., the light emitted from flash output window 52 is controlled in a known manner using a rheostat which is adjusted by turning knob 58. The setting of the flash intensity may be indicated by a graduated dial 60. Mode switch 56 is used to control the operation of flash attachment 48 for use with either close-up subjects, distant subjects (i.e., standard photography) or both. If flash attachment is electrically isolated from the circuitry of camera 10, mode switch 56 may mechanically or optically redirect the flash output to project its light from window 52 and concentrate the light at a predetermined distance, either close-up or farther away from camera 10. This type of isolated flash may include circuitry and sensors for instantly detecting the light from another local flash unit, such as flash 18 of camera 10 to determine that shutter button 36 had been depressed and thereby activate its own "close-up" flash 52.

If flash attachment 48 is wired into the circuitry of camera 10 as a modification, mode switch 56 controls the operations of both the originally supplied flash 18 (see FIG. 1 A) and the flash output of flash attachment 48. In this instance, mode switch 56 in a first position activates the flash of flash attachment 48 when close-up photography is to be performed, and in a second position activates flash 18 for subjects located a distance outside a predetermined close-up range (e.g., about two to about eighteen inches) such as in the case of standard photography. Another position may be provided for mode switch 56 to activate both flashes simultaneously to increase total flash light reaching the subject regardless of its location with respect to the camera.

Referring to FIGS. 2–6, a bracket assembly 62, according to the invention, is shown, including a secondary lens 64, a lens plate 66, spacer bar 68, and a frame indicator 70. Frame indicator 70 is secured to one end of spacer bar 68 using any appropriate permanent or removable fastener 69 including a spot weld, an adhesive, rivets, bolts, screws, Velcro, or a friction-fit connection. Frame indicator 70 is a U-shaped bracket which defines the location of the focal plane of secondary lens 64. This focal plane lies parallel to lens 64 and perpendicular to spacer bar 68. The purpose of frame indicator 70 is to provide a physical representation of the actual size of the image frame as "seen" by lens 64 of camera 10. The size and shape of frame indicator 70 will vary depending on the power and type of lens 64 used. If a particular secondary lens 64 has a depth of field equal to ¼ inch which includes a focal plane located 2 inches from camera 10, then spacer bar 68 will be 2 inches long so that frame indicator 70 lies just at the focal plane, within the ¼ inch depth of field. Three different sizes of frame indicators 70 are shown in FIG. 2, each having a secondary lens 64 of varying power and therefore each having different focal lengths, perhaps values from two to eighteen inches.

Figure 8:
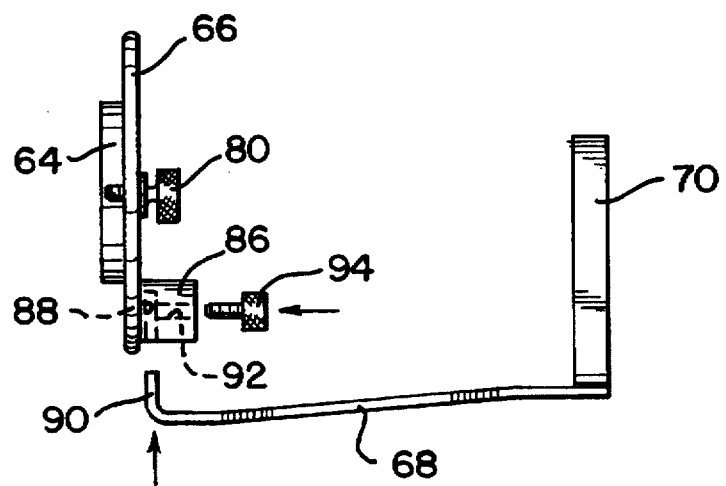
FIG. 8 is a partial sectional side view of the lens frame attachment, according to another embodiment of the invention.

The remaining end of spacer bar 68 (opposite frame indicator 70) is attached to lens plate 66 using any appropriate fastener 67 including the above-listed fasteners, or any other appropriate connector not listed. In a preferred embodiment, lens 64 of a predetermined power is secured to lens plate 66, across a central aperture 72 formed within lens plate 66. Lens 64 may be secured to lens plate 66 using known techniques for securing lenses to lens holders, such as using a threaded ring 73. Each lens 64 of a specific power is dedicated to a lens plate 66. Similarly, each frame indicator 70 is preferably permanently secured to a spacer bar 68 of predetermined length. The length of spacer bar 68 is dependent on the magnification power of the particular lens 64 in use. As shown in FIG. 8, the free end of spacer bar 68 is preferably removably attachable to lens plate 66 using an alignment block 86 which includes a slot 88 sized and shaped for snugly receiving a stem portion 90 of spacer bar 68. Alignment block 86 further includes a threaded bore 92 into which a thumb screw 94 engages. Bore 92 is positioned orthogonally to and in overlapping relationship with slot 88 so that tightening screw 94 frictionally engages clamps stem portion 90 (and therefore spacer bar 68 and frame indicator 70) within slot 88 at a predetermined orientation with respect to lens plate 66.

To ensure that each frame indicator 70 and spacer bar 68 matches its proper lens 64, according to one embodiment, a color code is used wherein a color indicator of a spacer bar 68 must match a color indicator located on a lens plate 66 before attaching the two elements together. In another embodiment (not shown) a spacer bar 68 is "keyed" to fit only a single lens plate 66 holding a single lens 64 of a predetermined power. The "keying" fastener may include a recess of a particular shape which only matches spacer bars 68 having a similar crosssection shape.

Figure 4:
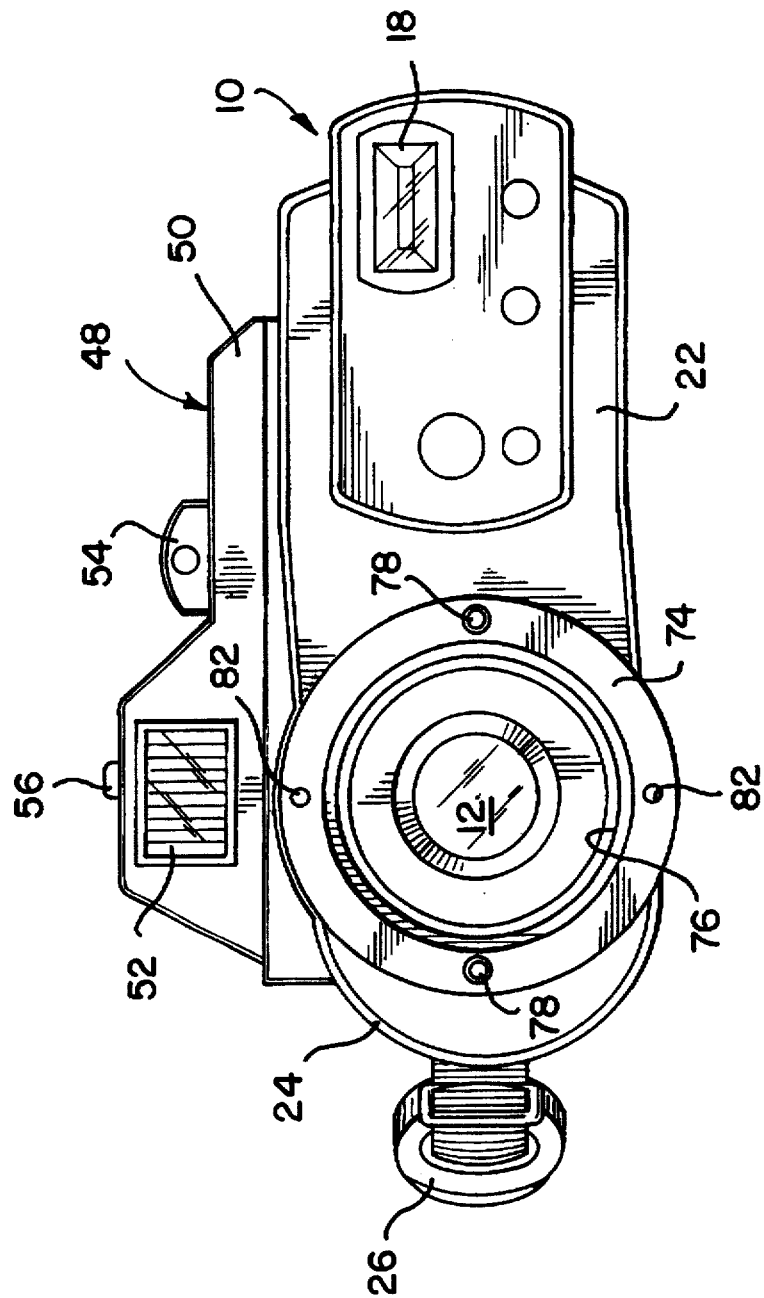
FIG. 4 shows a partial enlarged front view of the camera of FIG. 2 without the lens/frame attachment.
Figure 5:
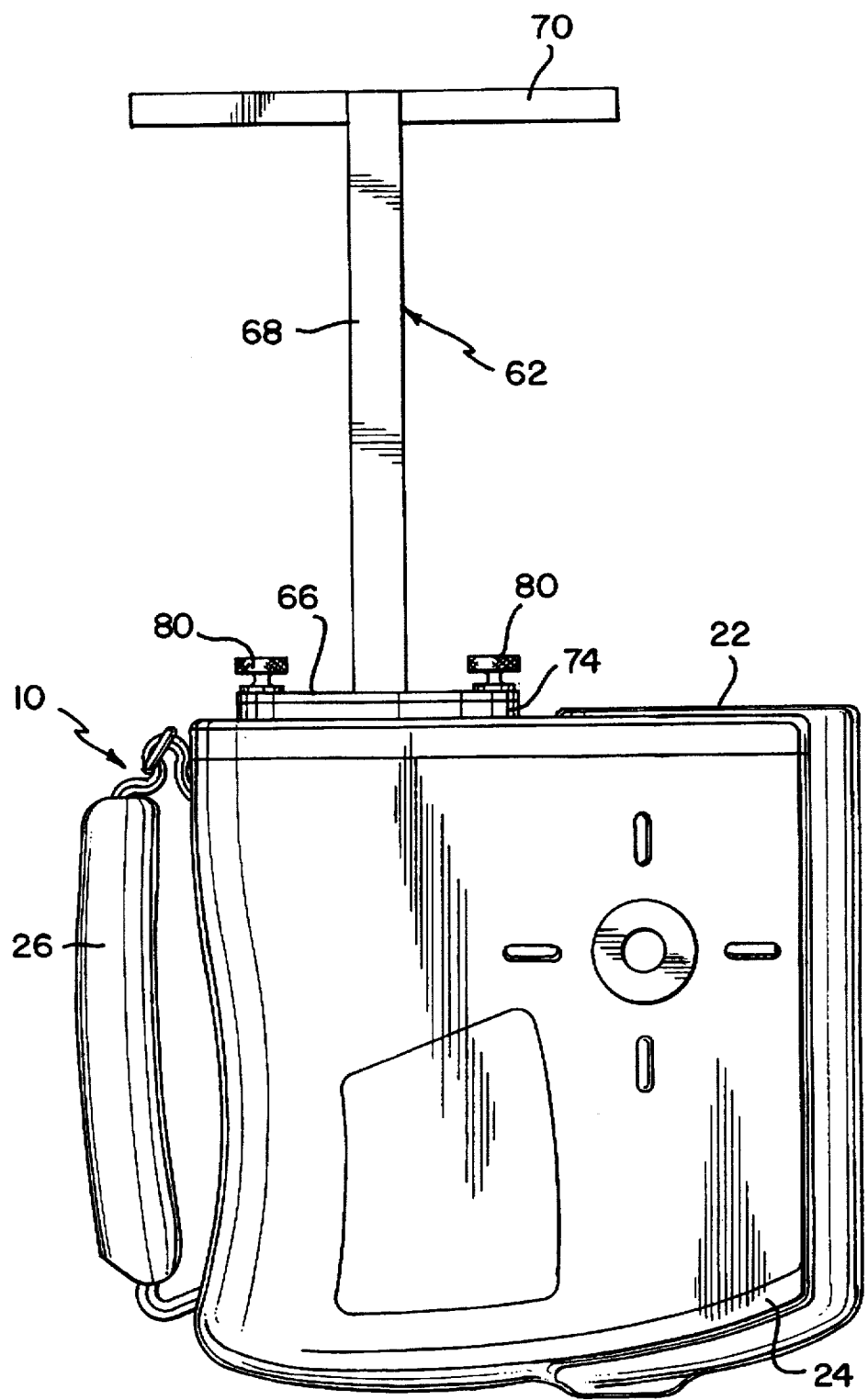
FIG. 5 shows a bottom view of the camera of FIG. 2 including a lens/frame attachment secured thereto.
Figure 6:
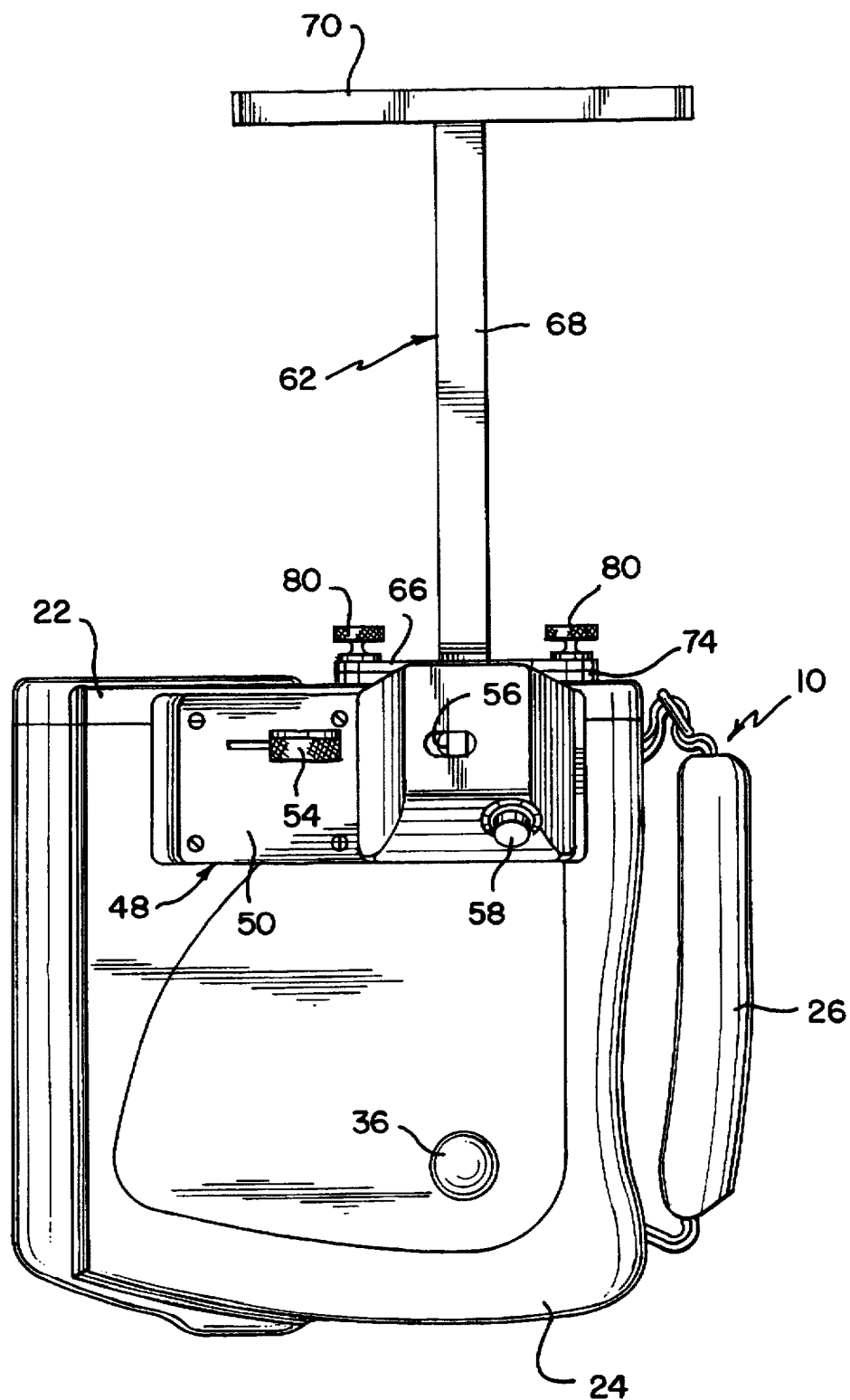
FIG. 6 shows a top plan view of the camera shown in FIG. 5.
Figure 7:
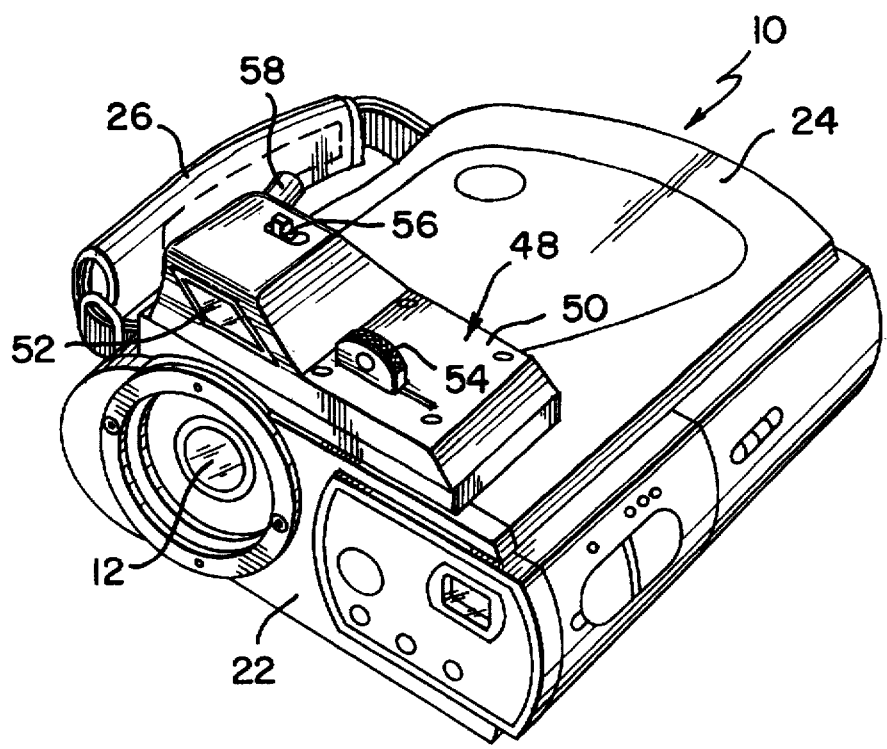
FIG. 7 is a diagrammatic perspective view of the front of the camera of the invention.

Referring to FIGS. 4, 5 and 6, lens plate 66 is secured to camera 10 using a mounting plate 74 which is includes a central aperture 76 which is aligned with aperture 72 of lens plate 66. Along a perimeter of mounting plate 74 is at least two threaded openings 78 adapted to align with two openings 79 located along the perimeter of lens plate 66. Thumb screws 80 may pass through openings 79 and engage with threaded openings 78 for holding lens plate 66 flush against mounting plate 74. Another two openings 82 may be provided on mounting plate 74 for receiving fasteners for securing mounting plate 74 to front surface 22 of camera housing 24. In another embodiment, mounting plate 74 includes a rearwardly directed flange (not shown) along the perimeter of central aperture 76 and having external threads which are adapted to engage internal threads located within a lens tube used to hold lens 12 to camera 10, as is known by those skilled in the art. In yet another embodiment, mounting plate 74 may be formed integrally with front surface 22, wherein threaded openings 78 are provided directly into front surface 22.

In another embodiment, as shown in FIG. 2, a length of chain 84 having one end attached to lens plate 66 and being a predetermined length (perhaps between two and eighteen inches) equal to the distance between the focal plane (of the combined lenses 12 and 64) and lens 64 so that the operator of camera 10 may simply hold the free end of chain 84 against the subject and position camera 10 accordingly, (i.e., until chain 84 is taut) to be assured that the subject is positioned within the focal plane.

In operation, a lens 64 is chosen according to desired magnification and image size of the subject to be photographed. Lens plate 66 having the chosen lens 64 is positioned flush against mounting plate 74 and thumb screws 80 are inserted through openings 79 of lens plate 66 and threaded into threaded openings 78 of mounting plate 74 until lens mount 66 is held flush to mounting plate 74.

Once secured, depending on the type of lens plate 66 selected, an appropriate frame indicator 70 (if not already attached to lens plate 66) may be secured to lens plate 66 using fastener 69. The above described lens mount 66 which includes a length of chain 84 to determine the location of the focal plane does not receive a frame indicator.

To ensure proper exposure to a recorded image, power switch 54 is switched to the "on" position and mode switch 58 is switched so that only the "close-up" flash 52 from flash attachment 48 will activate during exposure. Finally, rheostat knob 58 is rotated until a prescribed value of flash output intensity is selected, according to lens 64. Such flash intensity values would be predetermined and provided to the operator in a booklet or as a value stamped on camera 10 or lens plate 66.

Once the flash is ready, the operator moves camera 10 close to the subject so that the subject is positioned within frame indicator 70 and located a distance equal to or just greater than the length of spacer bar 68. This ensures that the subject is positioned within the depth of field and will be recorded in focus.

Shutter button 36 is depressed and only flash from flash attachment 48 activates and the subject is recorded by camera 10 with proper focus and exposure. The resulting digital photograph is electronically stored in the digital camera, until it is transmitted by coupling the camera output port to the desired peripheral device to show or electronically process the image.

What is claimed is:

1. An attachment for a digital camera of the type including an integral primary flash unit and a primary lens that are adapted to photograph subjects beyond a minimum predetermined distance from the camera, said attachment allowing the camera to photograph subjects located a distance that is shorter than said predetermined distance, said attachment comprising:

a flash assembly including a secondary flash unit, a mode switch and an intensity control, said secondary flash unit being adapted to properly expose subjects located at a distance from said camera which is less than said minimum predetermined distance, said mode switch selectively activating either said secondary flash unit or said primary flash unit during exposure;

means for attaching said flash assembly to said camera; and a supplemental lens selectively attachable to said camera in front of said primary lens for changing the effective magnification of said primary lens and thereby allowing the camera to photograph subjects located closer than said minimum predetermined distance.

* * * * *